(12) United States Patent
Klenkler et al.

(10) Patent No.: US 10,809,853 B2
(45) Date of Patent: Oct. 20, 2020

(54) OPTICAL SENSOR HAVING APERTURES

(71) Applicant: WILL SEMICONDUCTOR (SHANGHAI) CO. LTD., Shanghai (CN)

(72) Inventors: Richard Klenkler, San Jose, CA (US); Arash Akhavan Fomani, Saratoga, CA (US); Marek Mienko, San Jose, CA (US)

(73) Assignee: Will Semiconductor (Shanghai) Co. Ltd., Shanghai (CN)

( * ) Notice: Subject to any disclaimer, the term of this patent is extended or adjusted under 35 U.S.C. 154(b) by 40 days.

(21) Appl. No.: 16/041,096

(22) Filed: Jul. 20, 2018

(65) Prior Publication Data

US 2019/0179488 A1 Jun. 13, 2019

Related U.S. Application Data

(60) Provisional application No. 62/597,363, filed on Dec. 11, 2017.

(51) Int. Cl.
*G06F 3/042* (2006.01)
*G06F 3/041* (2006.01)
*G06K 9/00* (2006.01)

(52) U.S. Cl.
CPC .......... *G06F 3/0421* (2013.01); *G06F 3/0412* (2013.01); *G06K 9/00013* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,726,443 A | * | 3/1998 | Immega | H03K 17/941 250/227.2 |
| 2003/0111610 A1 | * | 6/2003 | Wagenaar | G01T 1/1644 250/363.04 |
| 2004/0252867 A1 | | 12/2004 | Lan et al. | |
| 2012/0039446 A1 | * | 2/2012 | Cui | A61B 6/06 378/149 |
| 2015/0369661 A1 | | 12/2015 | Lin | |
| 2016/0132712 A1 | * | 5/2016 | Yang | G06K 9/0002 348/77 |

* cited by examiner

*Primary Examiner* — Van N Chow
(74) *Attorney, Agent, or Firm* — Christensen O'Connor Johnson Kindness PLLC

(57) ABSTRACT

Systems and methods for optical imaging are disclosed. An optical sensor includes: an image sensor array comprising a plurality of pixels; and a collimator filter disposed above the image sensor array, the collimator filter comprising a plurality of light collimating apertures and light blocking material, wherein multiple light collimating apertures of the plurality of light collimating apertures are disposed within a photosensitive area of one of the pixels in the plurality of pixels, and wherein the multiple light collimating apertures are disposed over different portions of the photosensitive area of the one of the pixels.

6 Claims, 18 Drawing Sheets

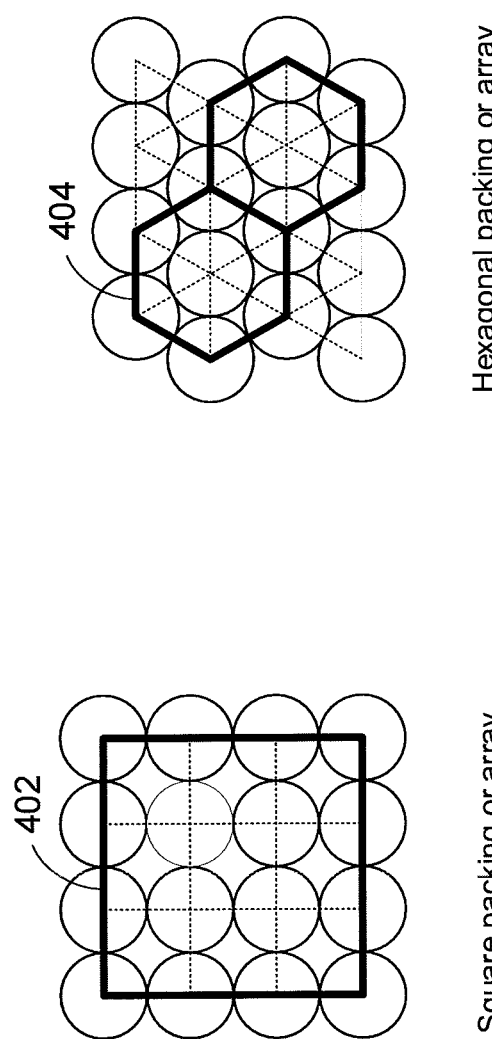
FIG. 4A  Square packing or array
FIG. 4B  Hexagonal packing or array

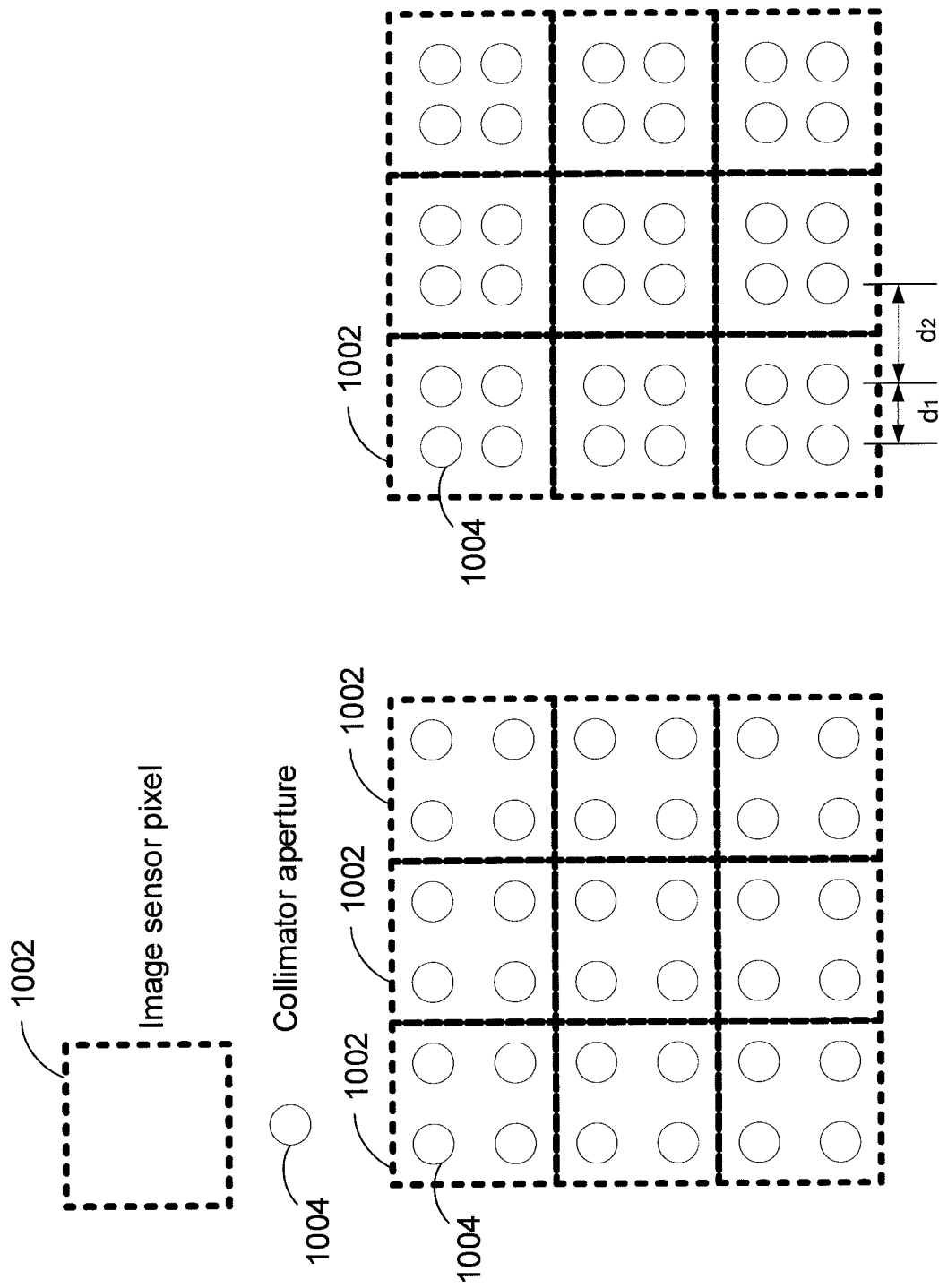

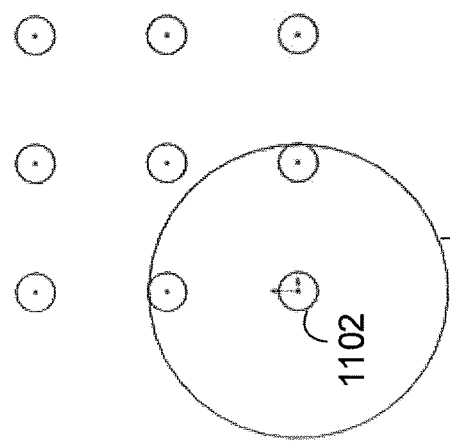
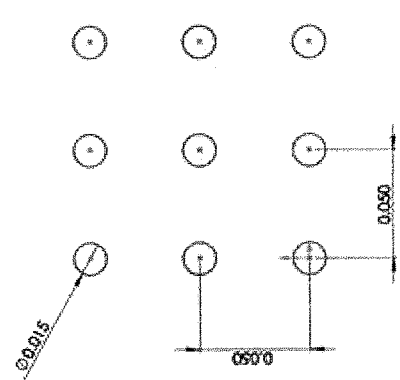
FIG. 11A
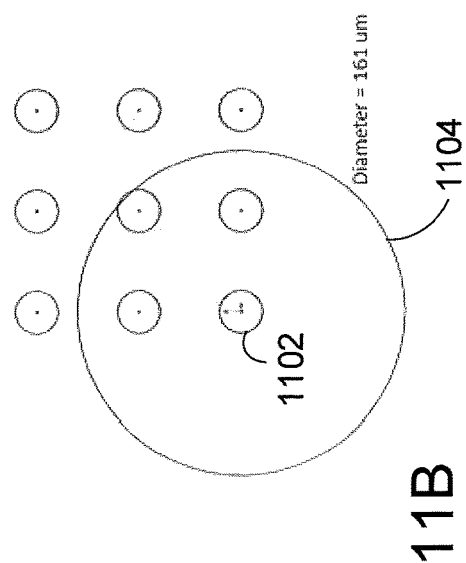
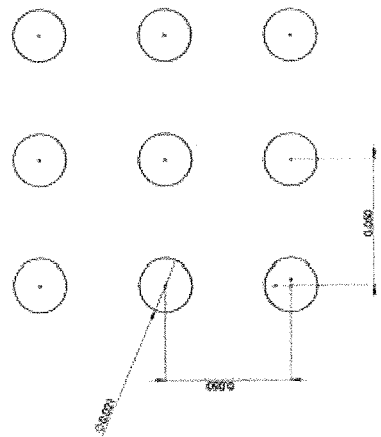
FIG. 11B

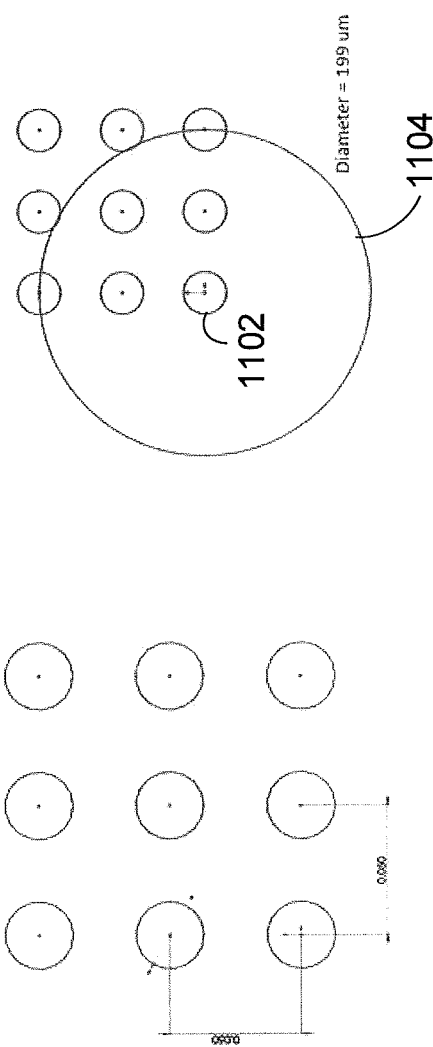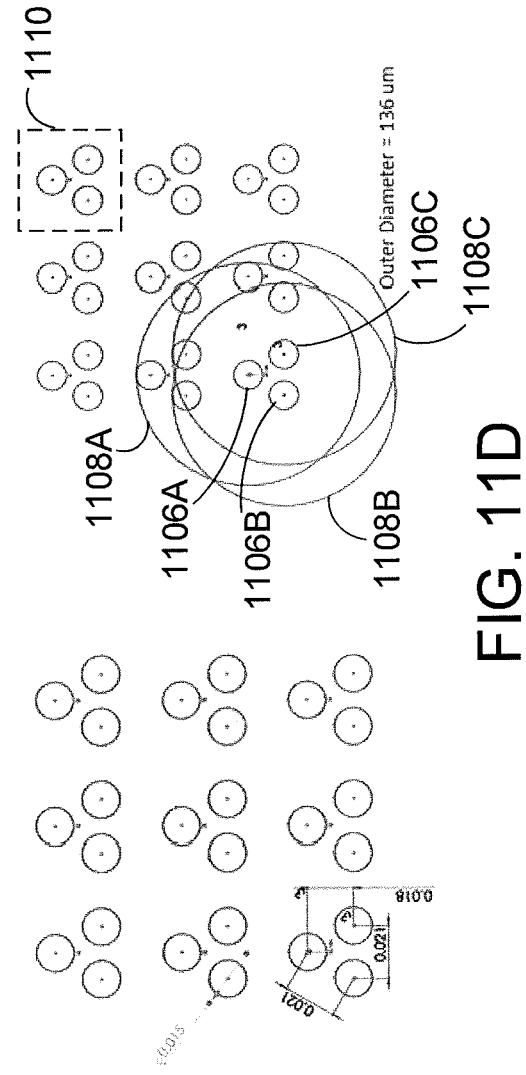
FIG. 11C
FIG. 11D

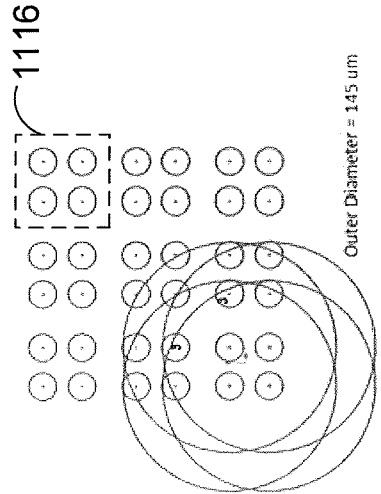
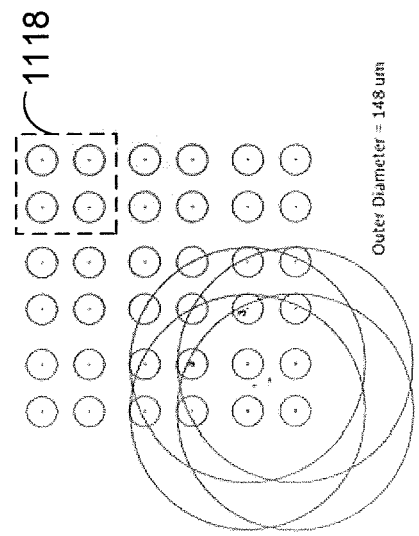
FIG. 11G
FIG. 11H
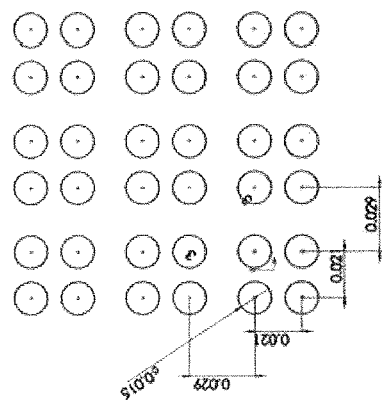
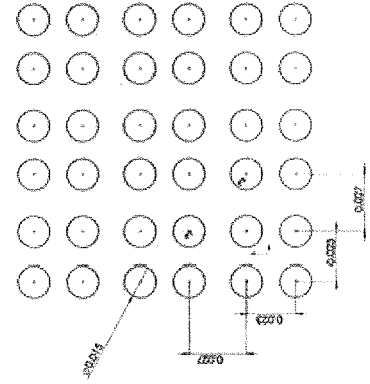

OPTICAL SENSOR HAVING APERTURES

CROSS-REFERENCE TO RELATED APPLICATIONS

This patent application claims priority of U.S. Provisional Patent Application Ser. No. 62/597,363, filed Dec. 11, 2017, which is hereby incorporated by reference in its entirety.

FIELD

Embodiments disclosed herein generally relate to optical sensors and, more particularly, to an optical sensor having apertures.

BACKGROUND

Object imaging is useful in a variety of applications. By way of example, biometric recognition systems image biometric objects for authenticating and/or verifying users of devices incorporating the biometric recognition systems. Biometric imaging provides a reliable, non-intrusive way to verify individual identity for recognition purposes. Various types of sensors may be used for biometric imaging.

SUMMARY

One embodiment provides an optical fingerprint sensor, comprising: an image sensor array comprising a plurality of pixels; and a collimator filter disposed above the image sensor array, the collimator filter comprising a plurality of light collimating apertures and light blocking material, wherein multiple light collimating apertures of the plurality of light collimating apertures are disposed within a photosensitive area of one of the pixels in the plurality of pixels, and wherein the multiple light collimating apertures are disposed over different portions of the photosensitive area of the one of the pixels.

In one aspect, the optical fingerprint sensor includes a silicon sensor substrate, wherein the image sensor array comprises an array of photodiodes formed in the silicon sensor substrate, wherein the photosensitive area of one of the pixels corresponds to a single one of the photodiodes. In another aspect, the optical fingerprint sensor includes a silicon sensor substrate, wherein the image sensor array comprises an array of photodiodes formed in the silicon sensor substrate, wherein the photosensitive area of one of the pixels corresponds to a plurality of the photodiodes.

In one aspect, the optical fingerprint sensor includes a glass thin film transistor substrate, wherein the image sensor array comprises a plurality of photodiodes formed on the glass thin film transistor substrate, wherein the photosensitive area of one of the pixels corresponds to a single one of the photodiodes. In another aspect, the optical fingerprint sensor includes a glass thin film transistor substrate, wherein the image sensor array comprises a plurality of photodiodes formed on the glass thin film transistor substrate, wherein the photosensitive area of one of the pixels corresponds to a plurality of the photodiodes.

Another embodiment provides a device, comprising: a display layer comprising a plurality of light emitting elements; an image sensor array comprising a plurality of pixels, wherein the image sensor array is disposed below the display layer, and configured to sense light emitted from the plurality of light emitting elements and reflected from a sensing surface of the device; and a collimator filter disposed between the display layer and the image sensor array, the collimator filter comprising a plurality of light collimating apertures and light blocking material, wherein multiple light collimating apertures of the plurality of light collimating apertures are disposed within a photosensitive area of one of the pixels in the plurality of pixels, and wherein the multiple light collimating apertures are disposed over different portions of the photosensitive area of the one of the pixels.

Yet another embodiment provides a method of imaging a fingerprint using a device, the method comprising: transmitting light in an illumination region such that at least a portion of light reflects from a sensing region; blocking at least a first portion of the light reflected from the sensing region at a surface of a collimating filter, wherein the collimating filter comprises a plurality of light collimating apertures and light blocking material; blocking at least a second portion of the light reflected from the sensing region within the plurality of light collimating apertures of the collimating filter; and sensing, at a plurality of optical sensor elements in a sensor array, a third portion of light reflected from the sensing region and passed through at least one of the plurality of light collimating apertures, wherein: the plurality of optical sensor elements are arranged into a plurality of pixels, at least two light collimating apertures of the plurality of light collimating apertures are disposed within a photosensitive area of one of the pixels in the plurality of pixels, and the at least two light collimating apertures are disposed over different portions of the photosensitive area of the one of the pixels.

BRIEF DESCRIPTION OF THE DRAWINGS

FIGS. 4A-4B illustrate examples of packing arrangements for collimators.

FIG. 10A-10B illustrate example collimator configurations relative to image sensor arrays in plan view (top view).

FIGS. 11A-11H illustrate comparisons of various example collimator arrangements.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

As described in greater detail herein, disclosed are methods and systems to optically image an input object, such as a fingerprint. In particular, a method and system are described where an optical sensor includes a collimator filter layer that operates as a light conditioning layer, interposed between a sensing region and an image sensor array. Transmitted light from a light source (e.g., an illumination layer or a display, for example) reflects from an input object in the sensing region above a cover layer. The reflected light is comprised of reflected light beams that are filtered by the collimator filter layer, such that a portion of the reflected light beams reach optical sensing elements in the image sensor array.

Employing the collimator filter layer of the present disclosure prevents blurring while allowing for a lower-profile image sensor, such as a fingerprint sensor, than is possible with purely lens-based or pinhole camera based imaging sensors. Thus, the image sensor can be made thin for use in mobile devices, such as cell phones. Placing collimator apertures over each optical sensing element, or group of elements, provides better sensitivity than purely pinhole based imagers by transmitting more light to the optical sensing elements. The present disclosure describes the use of the collimator filter layer to enable optical sensing through a large range of thicknesses of cover layers.

In certain embodiments, a collimator filter layer having multiple transversely spaced apertures is disclosed. In particular, a plurality of apertures (or "holes") can be spaced (or "clustered") over a single imaging cell (or "pixel"). In one embodiment, each pixel may comprise a single photo-sensor or photodiode. In another embodiment, each pixel may comprise two or more photo-sensors or photodiodes. Employing a plurality of collimator apertures per pixel may provide efficient packaging of collimator apertures, while maintaining a high aspect ratio.

Figure 1:
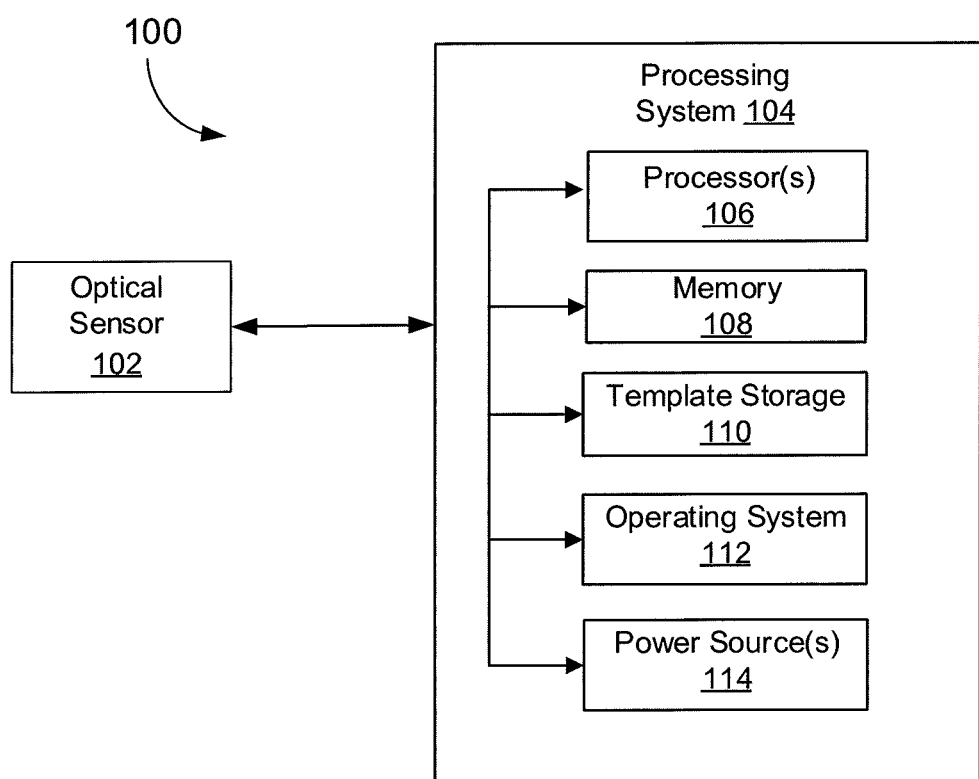
FIG. 1 is a block diagram of an example of a system that includes an optical sensor and a processing system, according to an embodiment.

Turning to the drawings, FIG. 1 is a block diagram of an example of an electronic device 100 that includes an optical sensor 102 and a processing system 104, according to an embodiment of the disclosure.

By way of example, basic functional components of the electronic device 100 utilized during capturing, storing, and validating a biometric match attempt are illustrated. The processing system 104 may include processor(s) 106, memory 108, template storage 110, operating system (OS) 112, and power source(s) 114. Processor(s) 106, memory 108, template storage 110, and operating system 112 may be connected physically, communicatively, and/or operatively to each other directly or indirectly. The power source(s) 114 may be connected to the various components in processing system 104 to provide electrical power as necessary.

As illustrated, the processing system 104 may include processing circuitry including one or more processor(s) 106 configured to implement functionality and/or process instructions for execution within electronic device 100. For example, processor(s) 106 execute instructions stored in memory 108 or instructions stored on template storage 110 to normalize an image, reconstruct a composite image, identify, verify, or otherwise match a biometric object, or determine whether a biometric authentication attempt is successful. Memory 108, which may be a non-transitory, computer-readable storage medium, may be configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 may also maintain program instructions for execution by the processor(s) 106.

Template storage 110 may comprise one or more non-transitory computer-readable storage media. In the context of a fingerprint sensor device or system, the template storage 110 may be configured to store enrollment views or image data for fingerprint images associated with a user's fingerprint, or other enrollment information, such as template identifiers, enrollment graphs containing transformation information between different images or view, etc. More generally, the template storage 110 may store information about an input object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 may also host an operating system (OS) 112. The operating system 112 may control operations of the components of the processing system 104. For example, the operating system 112 facilitates the interaction of the processor(s) 106, memory 108, and template storage 110.

According to some embodiments, the processor(s) 106 implements hardware and/or software to obtain data describing an image of an input object. In some implementations, the processor(s) 106 may also determine whether there is a match between two images, e.g., by aligning two images and compare the aligned images to one another. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 may include one or more power source(s) 114 to provide power to the electronic device 100. For example, the power source(s) 114 may provide power to one or more of the components of the processing system 104 and/or to the optical sensor 102. In some implementations, the power source(s) 114 may be external to the processing system 104 or external to the electronic device 100. Non-limiting examples of power source(s) 114 include single-use power sources, rechargeable power sources, and/or power sources developed from nickel-cadmium, lithium-ion, or other suitable material as well power cords and/or adapters, which are in turn connected to electrical power.

Optical sensor 102 can be implemented as a physical part of the electronic device 100, or can be physically separate from the electronic device 100. As appropriate, the optical sensor 102 may communicate with parts of the electronic device 100 using any one or more of the following: buses, networks, and other wired or wireless interconnection and communication technologies, such as buses and networks. Examples technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard. In some embodiments, optical sensor 102 is implemented as a fingerprint sensor to capture a fingerprint image of a finger of a user. In accordance with the disclosure, the optical sensor 102 uses optical sensing for the purpose of object imaging including imaging biometrics such as fingerprints. The optical sensor 102 can be incorporated as part of a display, for example, or may be a discrete sensor.

Some non-limiting examples of electronic devices 100 include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras).

In some embodiments, the optical sensor 102 may provide illumination to the sensing region. Reflections from the sensing region in the illumination wavelength(s) are detected to determine input information corresponding to the input object.

The optical sensor 102 may utilize principles of direct illumination of the input object, which may or may not be in contact with a sensing surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

The optical sensor 102 may also utilize principles of internal reflection to detect input objects in contact with a sensing surface. One or more light sources may be used to direct light in a light guiding element at an angle at which it is internally reflected at the sensing surface of the sensing region, due to different refractive indices at opposing sides of the boundary defined by the sensing surface. Contact of the sensing surface by the input object causes the refractive index to change across this boundary, which alters the internal reflection characteristics at the sensing surface, causing light reflected from the input object to be weaker at portions where it is in contact with the sensing surface. Higher contrast signals can often be achieved if principles of frustrated total internal reflection (FTIR) are used to detect the input object. In such embodiments, the light may be directed to the sensing surface at an angle of incidence at which it is totally internally reflected, except where the input object is in contact with the sensing surface and causes the light to partially transmit across this interface. An example of this is presence of a finger introduced to an input surface defined by a glass to air interface. The higher refractive index of human skin compared to air causes light incident at the sensing surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the sensing surface.

Figure 2:
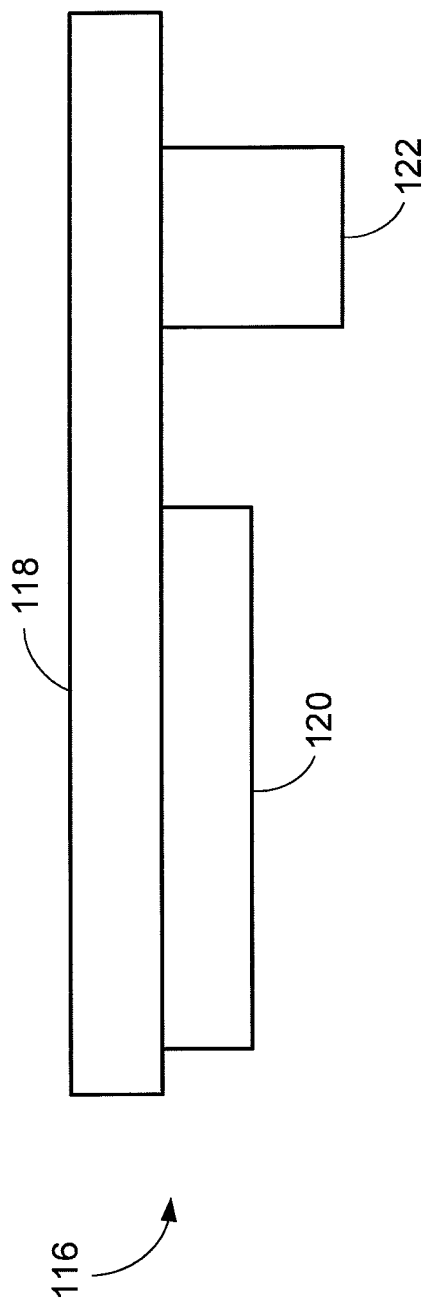
FIG. 2 illustrates an example of an electronic device that includes an optical sensor according to an embodiment.

FIG. 2 illustrates an example of an electronic device 116, such as a mobile phone, which includes a cover layer, e.g., cover glass 118, over a display 120. The disclosed method and system may be implemented such that the display 120 includes an optical sensor to image an input object. Alternatively, a separate discrete component 122 includes an optical sensor that provides the optical sensing capabilities. A discrete component 122 may provide more flexibility in designing the optical components of the sensor for optimum illumination and/or signal conditioning than when attempting to integrate the optical sensor components on a display substrate, such as a thin film transistor (TFT) backplane. In one embodiment, the discrete component 122 is not located beneath the display 120, as shown in FIG. 2. In another embodiment, the discrete component 122 is located beneath the display 120.

Figure 3A:
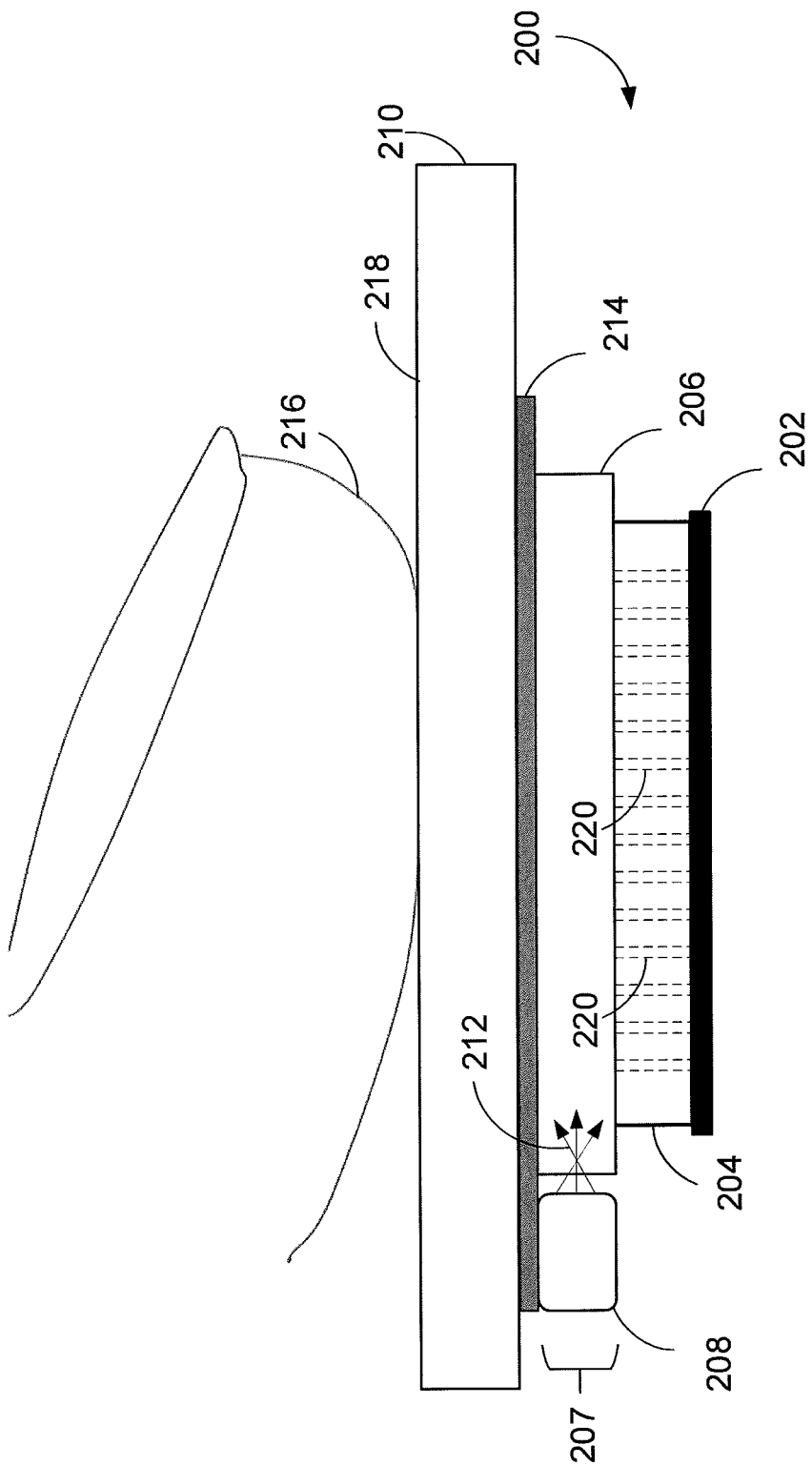
FIGS. 3A-3B illustrate examples of an optical sensor with a collimator filter layer according to an embodiment of the disclosure.

FIG. 3A illustrates an example of a stack-up for an optical sensor device 200 used to image an input object 216, such as a fingerprint. The optical sensor device 200 includes an image sensor array 202, a collimator filter layer (or light conditioning layer) 204 disposed above the image sensor array 202, an illumination layer 207 disposed above the collimator filter layer 204, a light source 208, and a cover layer 210. In certain embodiments, a blocking layer 214 may also be provided.

The cover layer 210 protects the inner components of the optical sensor device 200, such as the image sensor array 202. The cover layer 210 may include a cover glass or cover lens that protects inner components of a display in addition to the optical sensor device 200. A sensing region for the input object 216 is defined above the cover layer 210. A sensing surface 218 (i.e., top surface) of the cover layer 210 provides a contact area for the input object 216 (e.g., fingerprint). The cover layer 210 can be made of any suitable material such as glass, transparent polymeric materials and the like.

Although generally described in the context of a fingerprint for illustrative purposes, the input object 216 is any object to be imaged. The input object 216 may include various features, such as ridges and valleys. In general, when input object 216 comes into contact with the sensing surface 218, due to their protruding nature, the ridges contact the sensing surface 218 of the cover 210 layer. In contrast, the valleys do not contact the sensing surface 218 and instead form an air gap between the input object 216 and the sensing surface 218. The input object 216 may have other features such as stain, ink and the like that do not create significant structural differences in portions of the input object 216, but which affect its optical properties. The methods and systems disclosed herein are suitable for imaging such structural and non-structural features of the input object 216.

The illumination layer 207 includes a light source 208 and/or a light guiding element 206 that directs illumination to the sensing region in order to image the input object 216. As shown in FIG. 3A, the light source 208 transmits beams or rays of light 212 into the light guiding element 206 and the transmitted light propagates through the light guiding element 206. The light guiding element 206 may utilize total internal reflection, or may include reflecting surfaces that extract light up towards the sensing region. Some of the light in the illumination layer 207 may become incident at the sensing surface 218 in an area that is contact with the input object 216. The incident light is in turn reflected back towards the collimator filter layer 204. In the example shown, the light source 208 is disposed adjacent to the light guiding element 206. However, it will be understood that the light source 208 may be positioned anywhere within the optical sensor device 200 provided that emitted light reaches the light guiding element 206. For example, the light source 208 may be disposed below the image sensor array 202. Moreover, it will be understood that a separate light guiding element 206 is not required. For example, the light transmitted from the light source 208 can be transmitted directly into the cover layer 210 in which case the cover layer 210 also serves as the light guiding element. As another example, the light transmitted from the light source 208 can be transmitted directly to the sensing region, in which case the light source 208 itself serves as the illumination layer. In some embodiments, as described in greater detail in FIG. 3B, a discrete light source is not required, as the light from a display layer can be used to illuminate the input object 216 (e.g., finger).

The light provided by the illumination layer 207 to image the input object 216 may be in near infrared (NIR) or visible. The light can have a narrow band of wavelengths, a broad band of wavelengths, or operate in several bands.

The image sensor array 202 detects light passing through the collimator filter layer 204. Examples of suitable sensor arrays are complementary metal oxide semiconductor (CMOS) and charge coupled device (CCD) sensor arrays. The sensor array 202 may include a plurality of individual optical sensing elements capable of detecting the intensity of incident light. In some embodiments, the image sensor array 202 is formed in a silicon sensor substrate. In other embodiments, the image sensor array 202 is formed on a glass thin film transistor substrate.

To achieve optical sensing of fingerprints and fingerprint-sized features through thicker cover layers 210, light reflected from the fingerprint is conditioned by the collimator filter layer 204 so that the light reaching a sensing element in the image sensor array 202 comes from a small spot on the input object 216 directly above or nearly directly above the sensor element. In the absence of such conditioning, any light arriving at a sensing element from a region on the object far away from the optical sensing elements contributes to image blurring.

To condition the light in accordance with the disclosure, the collimator filter layer 204 is provided with an array of apertures, or collimator holes, 220 with each aperture being directly above one or more optical sensing elements on the image sensor array 202.

In certain embodiments, a plurality of apertures (cluster of apertures) may be above a single optical sensing element (also called an imaging cell) with the single optical sensing element comprising, for example, a single photosensor or multiple photosensors combined into a single pixel. The apertures 220 are formed using any suitable technique, such as laser drilling, etching, and the like. The collimator apertures or holes 220 may form an array of any suitable regular or irregular pattern.

For example, when viewed from above, the apertures may form a square pattern or packing or hexagonal pattern or packing, as but two examples as shown in FIGS. 4A-4B.

FIG. 4A shows a square packing of circular collimator holes. The centers of adjacent circular collimator holes in so-called "square packing" can be connected with lines forming a square 402. With square packing, for each row (i.e., left to right in the image in FIG. 4A) of circular collimator holes, the centers of the circular collimator holes align with the circular collimator holes of the other rows of circular collimator holes.

FIG. 4B shows a hexagonal packing of circular collimator holes. The centers of adjacent circular collimator holes in so-called "hexagonal packing" can be connected with lines forming hexagons 404. With hexagonal packing, the centers of the circular collimator holes are arranged in a hexagonal lattice (i.e., staggered rows, like a honeycomb), and each circular collimator hole is surrounded by six other circular collimator holes.

Referring back to FIG. 3A, the collimator filter layer 204 allows light rays reflected from the input object 216 (e.g., finger) at normal or near normal incidence to the collimator filter layer 204 to pass and reach the optical sensing elements of the image sensor array 202. In one embodiment, the collimator filter layer 204 is an opaque layer with array of holes 220. The collimator filter layer 204 may be laminated, stacked, or built directly above the image sensor array 202. By way of example, the collimator filter layer 204 may be made of a plastic material such as polycarbonate, PET, polyimide, carbon black, inorganic insulating or metallic materials, silicon, or SU-8. In certain embodiments, the collimator filter layer 204 is monolithic.

An optional blocking layer 214 may be part of optical sensor device 200. The blocking layer 214 may be a semi-transparent or opaque layer and may be disposed above the collimator filter layer 204. For example, the blocking layer 214 may be disposed between the cover layer 210 and the illumination layer 207, as shown in FIG. 3A. Alternatively, the blocking layer 214 may be disposed between the illumination layer 207 and the collimator filter layer 204. The blocking layer 214 may be configured to obscure ambient light illumination from reaching the image sensor array 202, while still allowing the optical sensor device 200 to operate. The blocking layer 214 may include a number of different materials or sub-layers. For example, a thin metal or electron conducting layer may be used where the layer thickness is less than the skin depth of light penetration in the visible spectrum. Alternatively, the blocking layer 214 may include a dye and/or pigment or several dyes and/or pigments that absorb light, for example, in the visible spectrum. As yet another alternative, the blocking layer 214 may include several sub-layers or nano-sized features configured to cause interference with certain wavelengths, such as visible light for example, so as to selectively absorb or reflect different wavelengths of light. The light absorption profile of the blocking layer 214 may be formulated to give a particular appearance of color, texture, or reflective quality thereby allowing for particular aesthetic matching or contrasting with the device into which the optical sensor device 200 is integrated. In some embodiments, a semitransparent layer may be used with visible illumination wavelengths to allow sufficient light to pass through the blocking layer to the sensing region, while still sufficiently obscuring components below.

Figure 3B:
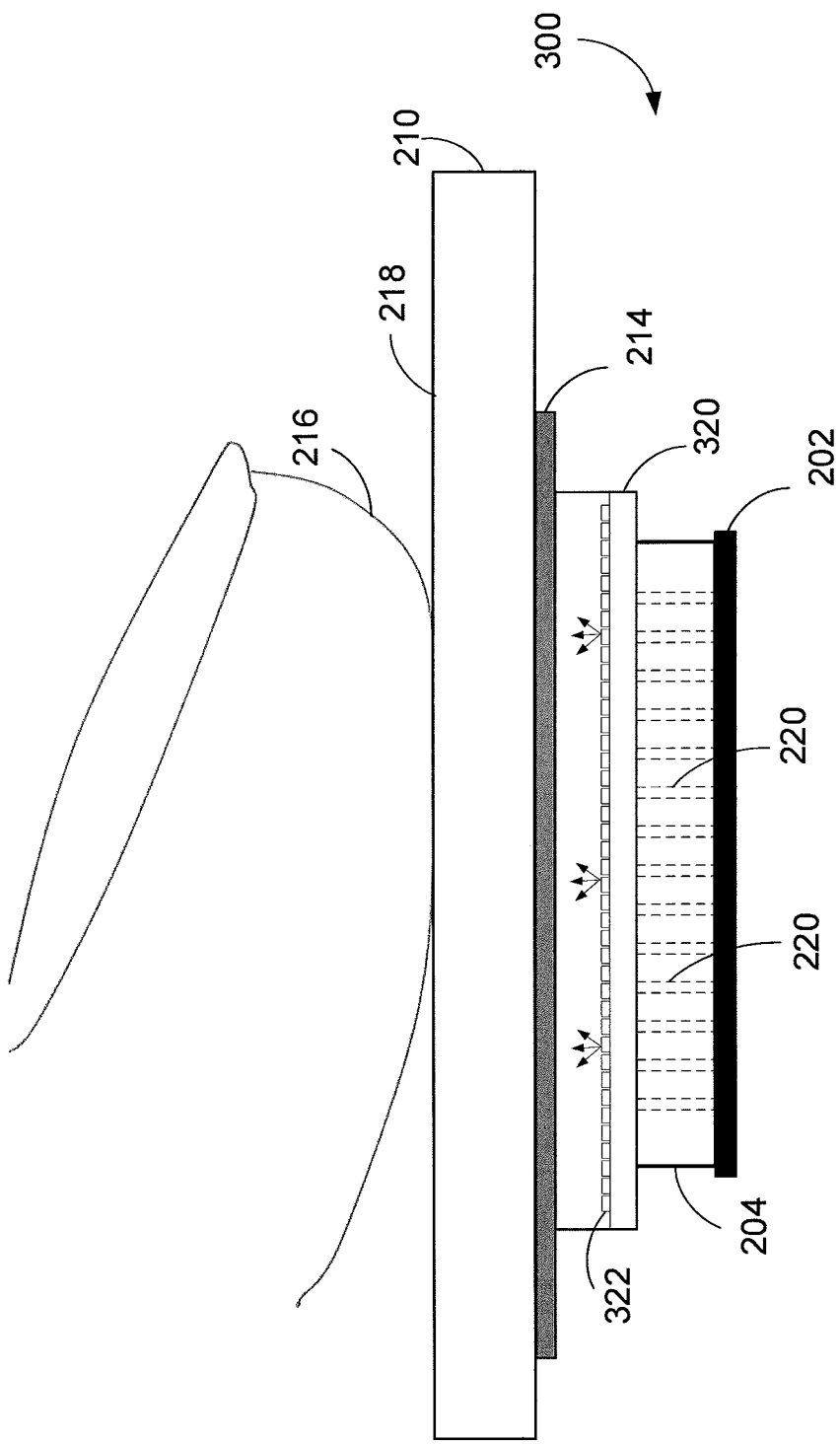

FIG. 3B illustrates another example of a stack-up for an optical sensor device 300. The optical sensor device 300 includes an image sensor array 202, a collimator filter layer (or light conditioning layer) 204 disposed above the image sensor array 202, a display layer 320 disposed above the collimator filter layer 204, and a cover layer 210. In some embodiments, an optional blocking layer 214 may also be provided. As shown in FIG. 3B, light from the display layer 320 may be used to illuminate the input object 216 (e.g., finger). In this embodiment, a discrete light source is not required.

The display layer 320 may comprise the display screen of an electronic device and may include a plurality of light sources 322. The display layer 320 may be any type of dynamic display capable of displaying a visual interface to a user, and may include any type of light sources 322, such as emitting diodes (LEDs), organic LEDs (OLEDs), cathode ray tube (CRT), liquid crystal display (LCD), plasma, electroluminescence (EL), or other display technology. The display layer 320 may also be flexible or rigid, and may be flat, curved, or have other geometries. In some embodiments, the display layer 320 includes a glass or plastic substrate for TFT circuitry and/or other circuitry, which may be used to provide visuals and/or provide other functionality. The cover layer 210 is disposed above display layer 320 and may provide a sensing surface 218 for the input object 216. Example cover layer 210 materials include plastic, optically clear amorphous solids, such as chemically hardened glass, as well as optically clear crystalline structures, such as sapphire.

When sensing input objects, e.g., sensing fingerprints or fingerprint-sized features through thicker cover layers 210, light emitted by the light sources 322 of the display layer 320 reflected from the input object 216 may be conditioned by the collimator filter layer 204 so that the light reaching a sensing element in the image sensor array 202 comes from portion of the input object 216 directly above the sensor element.

Figure 5:
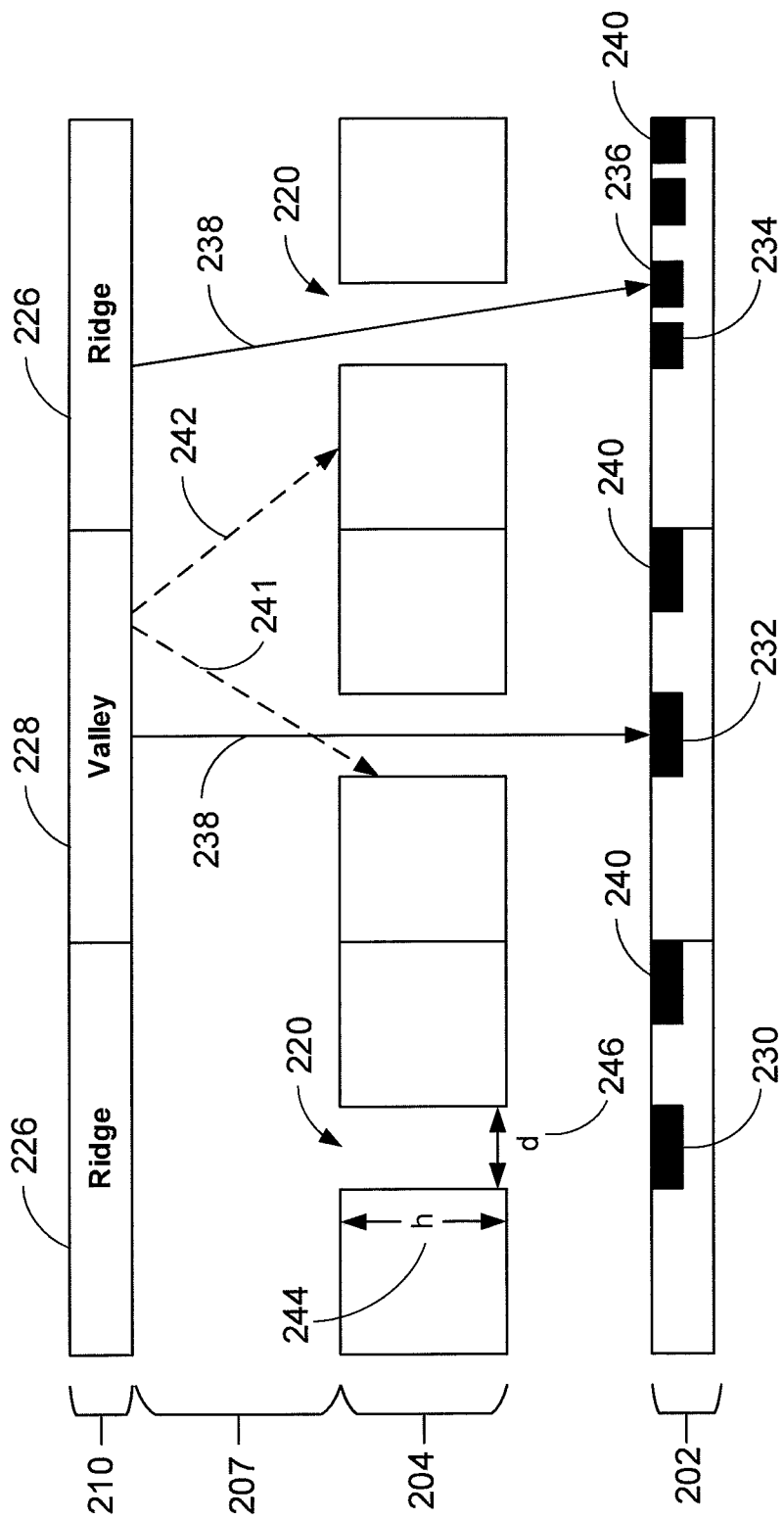
FIG. 5 illustrates an example of light interacting with an optical sensor device having a collimator filter layer according to an embodiment.

FIG. 5 illustrates a closer view of the collimator filter layer 204 and the image sensor array 202, and the interaction of light within the optical sensor device 200. Portions 226 of the cover layer 210 are in contact with ridges of the input object 216 and portion 228 of the cover layer 210 is in contact with air due to the presence of a valley of input object 216. Image sensor array 202 includes optical sensing elements 230, 232, 234, and 236 disposed below apertures or holes 220 of the collimator filter layer 204.

Illustratively shown are a series of light rays reflected at the cover layer 210. For example, light rays 238 reflect from the cover layer 210 at portions occupied by ridges or valleys of the input object 216. Because the light rays 238 are above collimator apertures 220 and are relatively near normal, the light rays 238 pass through the apertures 220 in the collimator filter layer 204 and become incident on optical sensing elements 232 and 236, for example. The optical sensing elements can then be used to measure the intensity of light and convert the measured intensity into image data of the input object 216. On the other hand, light beams 241 and 242, which have a larger angle from normal, strike the collimator filter layer 204, either on its top surface or at surface within the aperture (e.g., aperture sidewall) and are blocked and prevented from reaching optical sensing elements in the image sensor array 202.

A metric of the collimator filter layer 204 is an aspect ratio of the apertures or holes 220. The aspect ratio is the height of the holes (h) 244 in the collimator filter layer 204 divided by hole diameter (d) 246. The aspect ratio may be sufficiently large to prevent "stray" light from reaching the optical sensing elements directly under each collimator hole. An example of stray light is light ray 242 reflected from portion 228 of the cover layer 210 (e.g., a valley), which would reach sensing elements underneath a ridge in the absence of the collimator filter layer. Larger aspect ratios restrict the light acceptance cone to smaller angles, thus may improve the optical resolution of the system. The minimum aspect ratio can be estimated using a ratio of the distance from the collimator filter layer 204 to the object being imaged (e.g., finger) divided by the desired optical resolution of the finger. In some embodiments, the collimator apertures 220 are cylindrical or conical in shape. In various embodiments, each collimator hole has a square or rectangle cross-section. In other embodiments, each collimator hole has a circular or oval cross-section. In other embodiments, any shape cross-section could be used for the collimator holes, e.g., triangle-shaped. The sidewalls of the collimator apertures 220 may include grooves or other structures to prevent stray light from reflecting off the walls and reaching the optical sensing elements. The effective aspect ratio is determined by the average hole diameter along height of the collimator holes. Non-limiting examples of aspect ratios are ratios in the range of about 3:1 to 100:1 and more typically in the range of about 5:1 to 20:1.

In some embodiments, the height 244 of the collimator apertures 220 is made as thin as possible to provide flexibility for fabricating the collimator filter layer 204 and integrating it with the underlying image sensor array 202, such as a CMOS or CCD image sensor. A small aperture diameter 246 may be used to maintain the desired collimator aspect ratio. However, if the aperture is made too small (less than a few times the wavelength of light being used), diffraction effects can contribute to additional blurring as the light rays exiting the collimator apertures 220 diverge. Such diffraction effects can be mitigated by placing the collimator filter layer 204 as close to the image sensor array 202 as possible, e.g., much closer than the Fraunhofer far field distance (i.e., $r^2/\lambda$, where r is the aperture radius and $\lambda$ is the light wavelength).

In some embodiments, the distance between the collimator filter layer 204 and the image sensor array 202 is configured to allow the light reaching the optical sensing elements of the image sensor array 202 to be as concentrated as possible. If this sensor array 202 to collimator filter layer 204 distance is too large, stray light from adjacent holes may reach a particular optical sensing element, contributing to image blurring.

If the image sensor array 202 is a CCD or CMOS image sensor, where the optical sensing element pitch (distance between sensing elements) may be smaller than the collimator hole pitch (distance between holes), the light passing through a single collimator aperture 220 may illuminate more than one optical sensing element. Such an arrangement is shown by optical sensing elements 234 and 236 in FIG. 5. In such cases, the processing system (FIG. 1) may combine the light intensity recorded by all the optical sensing elements corresponding to a given collimator aperture. The resulting fingerprint image after processing raw data from the image sensor array 202 may have a resolution corresponding to the array of collimator apertures. It will be noted that some optical sensing elements in the sensor array 202 may not be used, e.g., sensing elements 240. Because optical sensing elements 240 are not underneath a collimator hole, reflected rays will be blocked before reaching them. Image processing may remove the unused sensor elements and scale the image appropriately before the data is used in image reconstruction or image matching, for example.

The imaging resolution (in dpi) of the optical sensor device 200 may be determined by the resolution of the apertures 220 in the collimation filter layer 204; whereas, the pitch is the distance between each imaging cell. In the optical sensor 200, each aperture 220 in the collimator filter layer 204 corresponds to a sample of a feature of the input object 216 being imaged, such as a sample from a ridge or valley within a fingerprint. To optimize resolution, the sampling density (which is equal to the aperture density) may be configured such that multiple samples are taken of each feature of interest. For example, to image ridges in a fingerprint, the pitch may be on the order of 50 to 100 microns since the pitch of the ridges themselves is on the order of 150 to 250 microns. To capture more granular features of an input object, such as pores in a fingerprint, a smaller pitch such as 25 microns may be used. Conversely, to capture larger features of the input object, a larger pitch can be used.

Performance of optical sensor 200 may be unaffected by distances between the collimator filter layer 204 and the sensing surface 220 because the optical resolution is determined by the aspect ratio of the holes in the collimator filter layer 204.

Figure 6A:
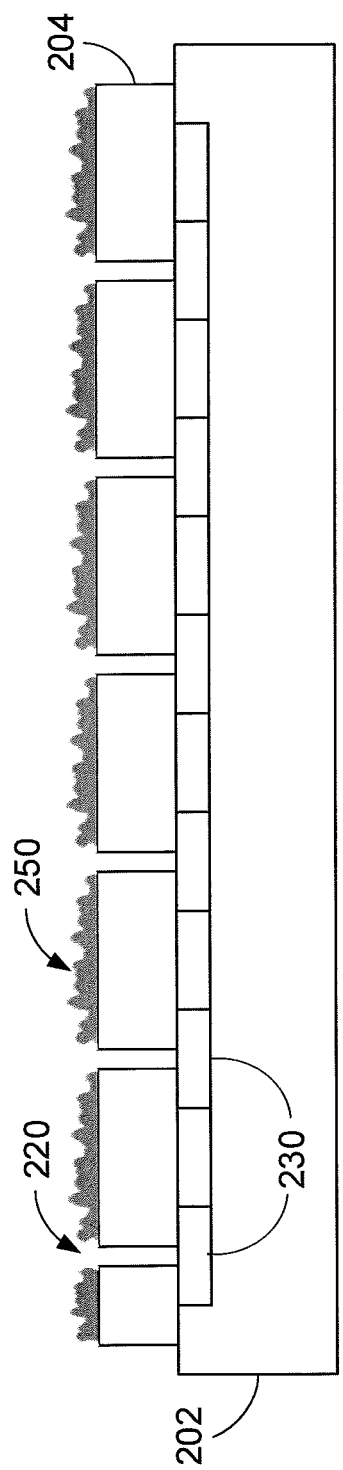
FIGS. 6A-6C illustrate exemplary collimator filter layer variations, according to some embodiments.
Figure 6B:
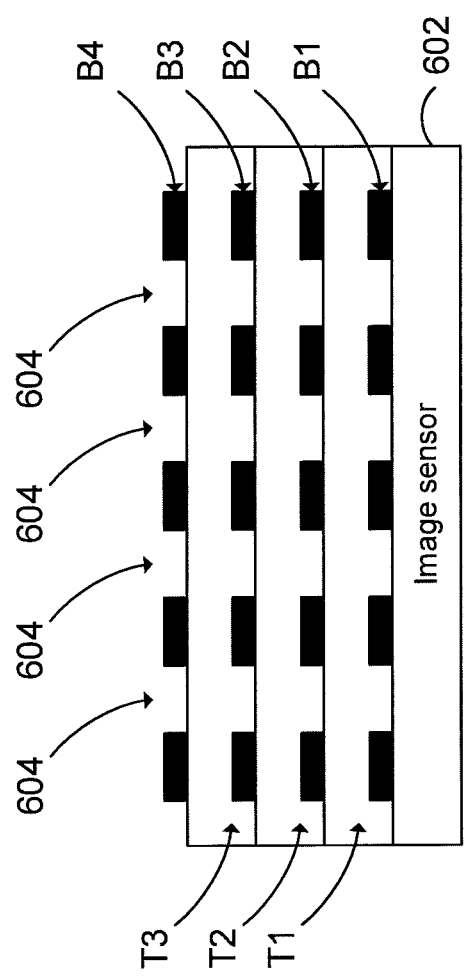
Figure 6C:
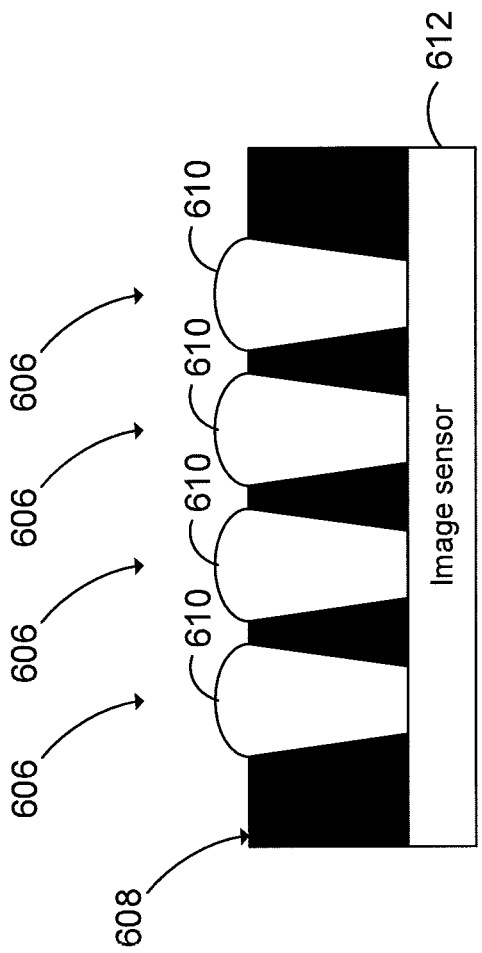

FIGS. 6A-6C provide additional example variations on the collimator filter layer 204.

FIG. 6A shows an embodiment of the collimator filter layer 204 including an optional reflecting layer 250. As described above, the collimator filter layer 204 may be made of light-absorbing materials and includes an array of apertures 220. In the alternative embodiment shown in FIG. 6A, the top surface of the collimator filter layer 204 further includes a reflecting layer 250. The reflecting layer 250 allows light beams that would otherwise be absorbed by the collimator filter layer 204 to be redirected, e.g., reflected back upwards towards the sensing region. Redirecting the light back to the sensing region allows the reflected light to be recycled so that some of the recycled light can be reflected off the input object to be imaged and transmitted through the collimator filter layer apertures.

Inclusion of the reflecting layer 250 may reduce light loss by reflecting the stray light back to the input object 216 without requiring a high level of illumination in the overall sensor package. The top of the light-absorbing collimator filter layer body may be roughened up using various texturizing techniques, including but not limited to, sandblasting, coating with fillers, UV embossing, or dry etching. This roughened-up top may then be covered with a thin layer of metal, which creates a surface that is multifaceted in a randomized fashion. The reflecting layer 250 may be made of any suitable light reflecting material such as aluminum, chromium, and silver to name a few examples.

The method and system disclosed contemplate various ways to include the collimator filter layer 204 into the overall structure of the optical sensor 200. For example, the collimator filter layer 204 may be a pre-patterned structure that is laminated or stacked onto the image sensor array 202, as generally depicted in FIGS. 3A-3B. Alternative embodiments are contemplated by present disclosure. For example, one alternative embodiment is to pattern or create the collimator filter layer 204 directly onto a CMOS image sensor die or wafer, as generally depicted in FIG. 6A. For example, a wafer-level collimator layer may be formed by micro-fabrication. Instead of placing a separate collimator filter layer 204 on top of the image sensor array 202, back-end processes may be added to CMOS image sensor array fabrication. With this technique, no separate manufacturing of the collimator filter layer is required. On top of the CMOS image sensor array, liquid-type polymer resin with light-absorbing dyes such as carbon black may be coated first then cured to form the collimator filter layer body. After the polymer resin is cured, metal may be optionally sputtered onto the cured resin top to act as a reflective layer. The aperture pattern may be made through photolithography and etching of the metal and the polymer layer underneath subsequently to create the apertures. As a final step, the metal layer can be roughened up to create a reflecting/diffusing layer.

In yet another embodiment, the collimator filter layer 204 is replaced or supplemented with an optical interference filter that blocks "stray" light at angles of incidence that are relatively far from normal to the imaging plane. Multilayer optical filters can be used that transmit light at incidence near normal in much the same way such a filter can be constructed to only transmit light at specific wavelengths. Although such an angle-specific filter may be configured to work for specific light wavelengths, such an interference filter may be used to reject the stray light coming from adjacent ridges and valleys.

The collimator filter layer 204 may also be a transparent glass collimator filter with round openings on top and bottom. This type of collimator filter layer may be made using double-sided alignment technique to create top and bottom openings that are aligned, but without physically hollow holes through the glass body. The top surface of the collimator filter layer can be textured to be a diffuser for the light entering while the bottom surface can be metallic to recycle by reflecting the light back to the transparent glass body. One of the advantages is that this method makes lamination simpler since there are no physically hollow apertures. With this glass collimator filter layer, cover glass, light guide film, and glass filter can be laminated with readily available lamination equipment.

In some embodiments, an opaque glass collimator filter with drilled apertures can be used. This is similar to the previously described collimator filter film. The manufacturing method may be the same, except for the fact that the body is glass. The aperture density is determined based on the required dpi.

FIGS. 6B-6C illustrate additional embodiments of collimators that may be optionally used, shown in cross section view (side view).

FIG. 6B illustrates a collimator filter layer that is generally constructed of alternating layers of blocking material (light absorbing) and transparent material. For example, layers B1, B2, B3, and B4 illustrate light blocking layers, which comprise blocking material forming apertures 604. Interposed between the blocking layers are layers T1, T2, and T3, which comprise transparent material. In general, the layers T1, T2, and T3 are sufficiently transparent to light wavelength(s) of interest while the light blocking layers are sufficiently opaque to the light wavelength(s) of interest to collectively form light collimating apertures 604. For example, the light blocking layers may include black layers that are opaque and absorptive to visible and infrared wavelengths (low transmission, low reflectance). The arrangement may be formed onto, or affixed to an image sensor 602. The image sensor 602 may be formed on an image sensor substrate or image sensor wafer (e.g., a CMOS or TFT-based image sensor). The openings 604 need not be the same width at each layer. For example, the openings in the blocking layer furthest from the image sensor wafer (e.g., openings in layer B4) may be larger compared to the openings in the blocking layer closest to the image sensor wafer (e.g., layer B1). The configuration of FIG. 6B facilitates patterning the light absorbing layers as desired through the collimator, including any desired cluster or packing arrangement.

FIG. 6C illustrates yet another collimator filter layer that uses light blocking material 608 and light collimating apertures 606. The collimator filter layer also includes microlenses 610 formed at an upper surface of the collimator filter layer. The collimator filter layer includes apertures 606 having inwardly sloping sidewalls, which causes the apertures 606 to have a larger diameter further from an image sensor 612 than a diameter closer to the image sensor 612.

Figure 7:
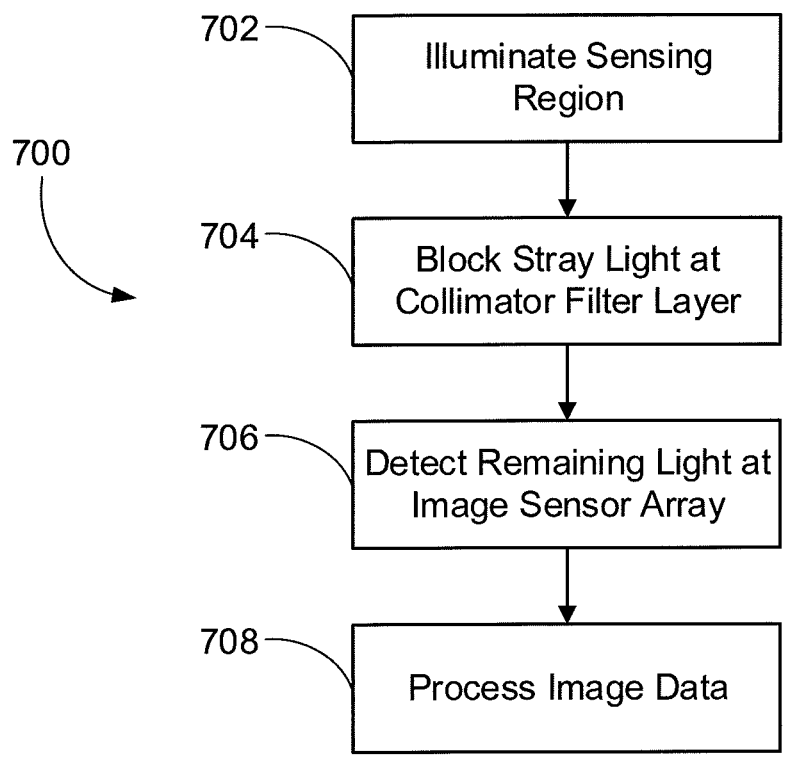
FIG. 7 illustrates a method of imaging an input object according to an embodiment.

FIG. 7 shows a method 700 of imaging in accordance with the present disclosure.

In step 702, the sensing region is illuminated using an illumination layer having a light source and/or light guiding element. As previously described, this may be done by using a light source directing light into a separate light guiding element or by transmitting light directly into the cover layer. As noted, the display, e.g., LED, OLED or other emissive display may be used as the light source. The transmitted light is directed towards a sensing region above the cover layer and reflected from the object towards the collimator filter layer.

In step 704, some of the reflected light is blocked at the collimator filter layer while other light passes through apertures in the collimator filter layer. Generally, light rays at relatively near normal incidence to the collimator filter layer will pass through the apertures while light rays further from normal incidence will be blocked. Light may be blocked by the top surface of the collimator layer, an intermediate layer of the collimator, a bottom layer of the collimator, or sidewalls of the collimator aperture.

In step 706, the light which passes through the collimator filter layer becomes incident on one or more optical sensing elements on the sensor array below the light collimator layer. In instances where more than one sensing element is below a particular aperture in the collimator filter layer, the detected light at the sensing elements may be averaged or otherwise combined. The image data may be adjusted to account for sensing elements that are not below an aperture. As also noted, in some embodiments, multiple apertures (for example, a set of clustered apertures) may be above a single sensing element, which in turn may comprise one or more photosensors.

In step 708, the detected light at the image sensor array is processed to form an image or a partial image of the input object. Such processing may include, for example, stitching partial images together, relating various partial images to one another in a template, and/or comparing captured image data to previously stored image data as part of an identification or verification process.

Some aspects of this disclosure provide a biometric sensor utilizing a collimator structure having an arrangement that can facilitate a high collimator fill factor with little impact to aspect ratio. Also provided is a regular or irregular collimator pattern that allows for alignment to an image sensor pixel array (i.e., array of sensing elements). An efficient collimator-based fingerprint sensor collects as much light as possible while also having a high aspect ratio with little cross talk between collimator holes or apertures.

One way to achieve such a collimator is by using a high aspect ratio and high resolution collimator aligned to an equally high resolution image sensor. However, such collimator structures have certain drawbacks including high image sensor-to-collimator alignment tolerance and high bandwidth image processing requirements. Moreover, such collimator holes are limited to a packing arrangement that matches the sensor array, where one collimator hole gives one pixel in the reconstructed image. This arrangement gives collimators with an inherently low fill factor (i.e., number of collimator holes per unit area).

Disclosed embodiments can avoid or mitigate the foregoing limitations by employing multiple high aspect ratio collimator holes placed or clustered over a single sensing element or image sensor pixel (e.g., a single photodiode or other photosensor). Alternate embodiments provide a binned or combined group of sensing elements or image sensor pixels (e.g., multiple photodiodes or other photosensors that are combined into a single pixel in the reconstructed image). The disclosed arrangements provide a high packing factor, giving a higher fill factor, while still maintaining an overall higher group aspect ratio than a single larger diameter (i.e., low aspect ratio) collimator aperture or hole. The disclosed collimator arrangement also allows for a square pixel arrangement in the reconstructed image.

Figure 8B:
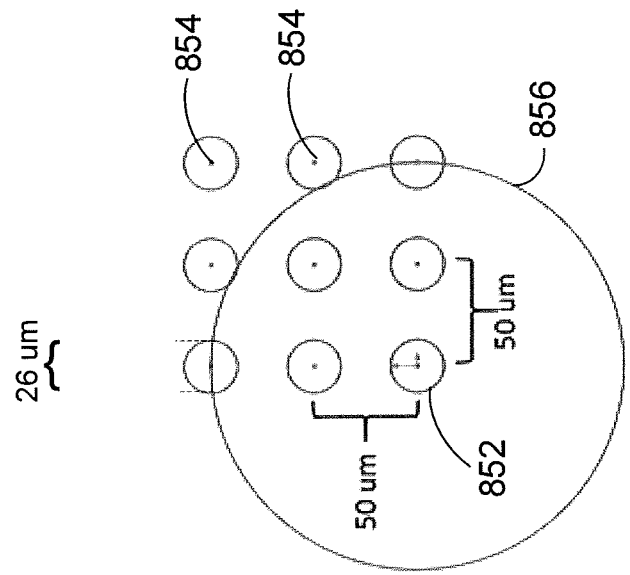
FIG. 8A-8B illustrate various example collimator arrangements.
Figure 8A:
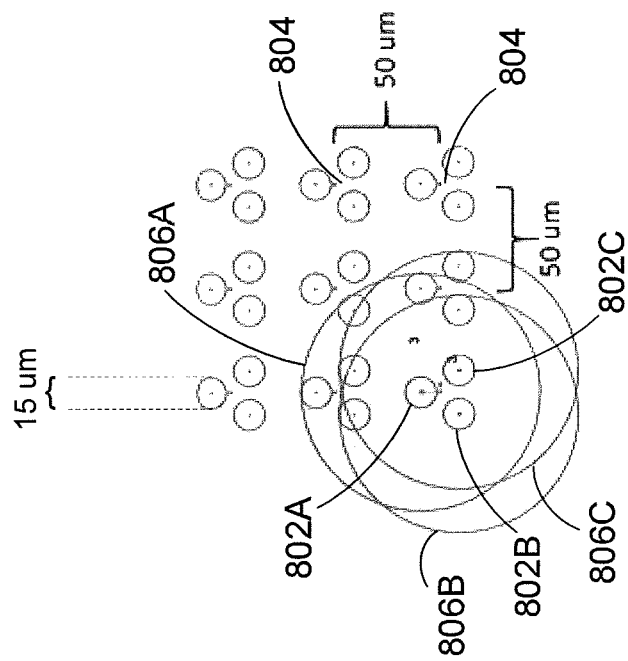

FIGS. 8A-8B compare an embodiment of a collimator filter layer with clustered holes or apertures discussed above (i.e., FIG. 8A) with a single large area hole configuration (i.e., FIG. 8B).

In FIG. 8A, collimator holes 802A, 802B, 802C are arranged to form a cluster of collimator holes. The cluster of collimator holes comprised of the collimator holes 802A, 802B, 802C corresponds to single sensing element (e.g., pixel) of the image sensor. A pitch of the sensing elements in the configuration in FIG. 8A is defined by the distance between the centers 804 of adjacent three-hole clusters. In the example shown in FIG. 8A, the pitch is 50 um. As also shown, the diameter of each collimator hole 802A, 802B, 802C is 15 um. In this example, the area of the cluster of collimator holes 802A, 802B, 802C is approximately 530 um$^2$ (i.e., 3 holes*$\pi(d/2)^2$=3*176.71=530.14). Also shown in FIG. 8A are the projected viewing cones 806A, 806B, and 806C that correspond to the collimator holes 802A, 802B, 802C, respectively. The projected viewing cones 806A, 806B, and 806C corresponds to an area of the input object (e.g., finger) that is being sensed by the image sensor through the cover glass. In the example shown in FIG. 8A, the projected viewing cones 806A, 806B, and 806C are based on a cover glass with thickness of 500 um. The size or area of the projected viewing cones 806A, 806B, and 806C is based on the thickness of the cover glass. In the example shown, the cover glass thickness off 500 um, although any thickness of cover glass is within the scope of the disclosure.

In FIG. 8B, collimator holes 852 are arranged such that each collimator hole 852 corresponds to a single sensing element (e.g., pixel) of the image sensor. A pitch of the sensing elements in the configuration in FIG. 8B is defined by the distance between the centers 854 of adjacent collimator holes 852. In the example in FIG. 8B, the pitch is 50 um (i.e., same pitch as in FIG. 8A). As also shown, the diameter of each collimator hole 852 is 26 um. In this example, the area of each collimator hole 852 is approximately 530 um$^2$ (i.e., 1 hole*$\pi(d/2)^2$=1*530.93=530.93). Also shown in FIG. 8B is the projected viewing cone 856 that corresponds to the collimator hole 852. In the example shown in FIG. 8B, the projected viewing cone 856 is based on a cover glass with thickness of 500 um.

As seen by comparing FIG. 8A and FIG. 8B, the collimator configuration with the clustered set of high aspect ratio holes (FIG. 8A) provides a higher effective aspect ratio while still having the same fill factor (pitch, i.e., 50 um) as compared with a collimator configuration with a single large area hole (FIG. 8B). In some implementations, decreasing the size of the projected viewing cones can decrease crosstalk or blur.

Figure 9:
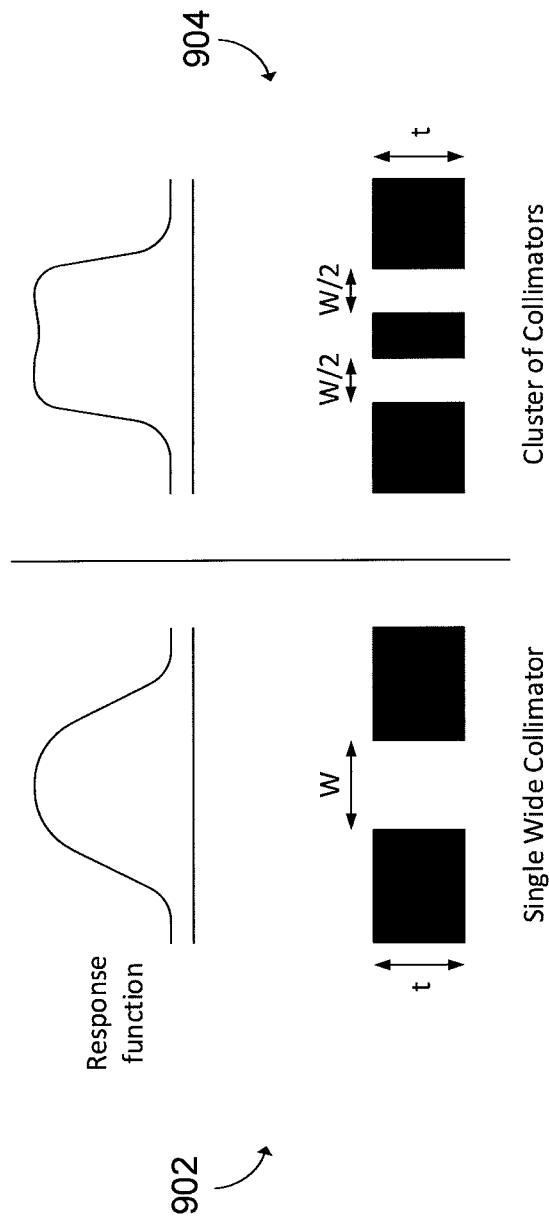
FIG. 9 illustrates various collimator arrangements and corresponding response functions.

FIG. 9 shows an amplitude of a response function for an optical sensor with a collimator having a single hole 902 and for a collimator having two holes 904 in the pass band. As shown in FIG. 9, the slope of the transition band is sharper for the collimator having two holes 904 than that for the collimator having a single hole 902. A sharper slope of the response function can improve the contrast ratio of the image.

A cluster of collimators can be configured to adjust the response function of the system. For example, the number and dimensions of the collimators that are bundled and the distance and arrangement of the collimators can be modified to adjust the response function.

FIG. 10A-10B illustrate example collimator configurations relative to image sensor arrays in plan view (top view).

diameter, collimator filter layer thickness, hole area (per pixel), acceptance angle ("Theta") per hole, number of holes in the cluster, packing type (e.g., hexagonal or square), wall thickness between holes in a cluster, acceptance angle ("Theta") of the cluster, and effective spot size diameter of an input object (e.g., finger) through a thick (e.g., 500 um) cover layer.

Table 1 shows a comparison of the various example configurations of FIGS. 11A-11H.

TABLE 1

Figure 11E:
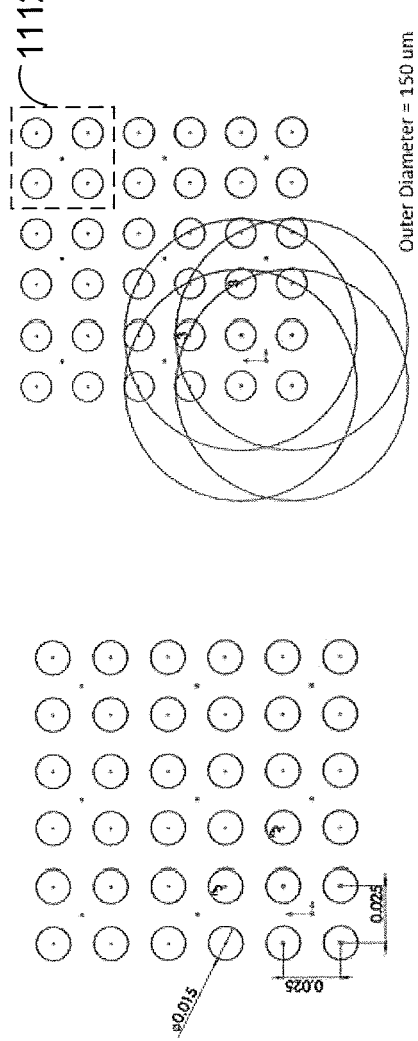
Figure 11F:
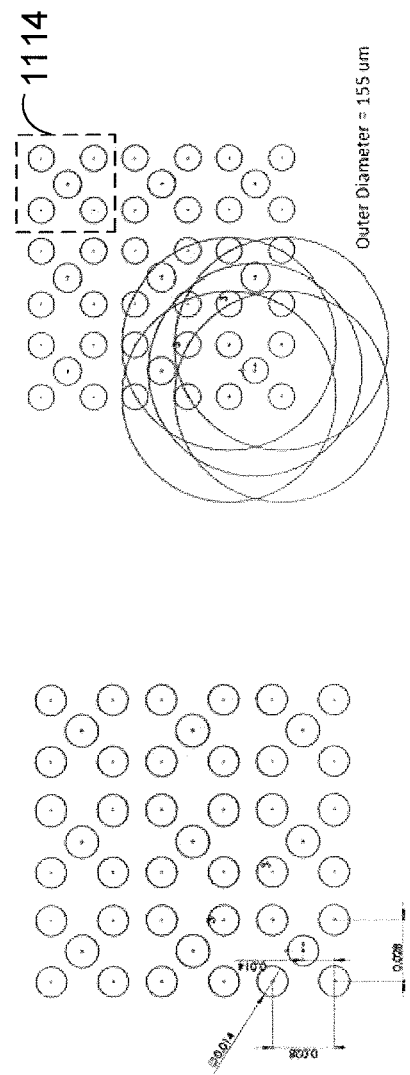

| FIG. | Hole diameter (um) | Collimator layer thickness (um) | Hole area (um) | Theta (deg) per hole | Num. of holes in cluster | Packing (per cluster) | Min. wall thickness between holes | Theta of cluster (deg) | Effective spot size diameter (um) on finger through 500 um glass |
|---|---|---|---|---|---|---|---|---|---|
| FIG. 11A | 15 | 150 | 176 | 5.7 | 1 | — | — | — | 115 |
| FIG. 11B | 21.21 | 150 | 354 | 8.1 | 1 | — | — | — | 163 |
| FIG. 11C | 26 | 150 | 528 | 9.8 | 1 | — | — | — | 199 |
| FIG. 11D | 15 | 150 | 528 | 5.7 | 3 | Hexagonal | 6 | 6.7 | 136 |
| FIG. 11E | 15 | 150 | 704 | 5.7 | 4 | Square | 10 | 7.4 | 150 |
| FIG. 11F | 14 | 150 | 880 | 5.7 | 5 | Square | 6 | 7.7 | 155 |
| FIG. 11G | 15 | 150 | 704 | 5.7 | 4 | Square | 6 | 7.2 | 145 |
| FIG. 11H | 15 | 150 | 704 | 5.7 | 4 | Hexagonal | 8 | 7.3 | 148 |

The dotted lines represent the photosensitive area of a pixel (e.g., a photodiode) 1002. The circles represent the light collimating apertures 1004. FIGS. 10A-10B show examples of positioning multiple apertures 1004 within a photosensitive area of a single pixel 1002. For example, multiple apertures 1004 can be transversely positioned relative to each other over different portions of the photosensitive area of the single pixel 1002.

In FIG. 10A, the image sensor pixels 1002 are arranged in a square array. Each image sensor pixel 1002 may correspond to a single photodiode or multiple photodiodes. The photodiodes can be arranged in an array of photodiodes. The collimator apertures 1004 in FIG. 10A are arranged above the image sensor pixels 1002 in the same type of pattern as an arrangement where one collimator aperture 1004 corresponds to one image sensor pixel, but at a higher density. As a result, multiple collimator apertures 1004 (i.e., four in the example shown in FIG. 10A) are laid out across an active area of a single image sensor pixel 1002. In FIG. 10A, the collimator apertures are also arranged with uniform spacing.

FIG. 10B illustrates another collimator configuration relative to an image sensor array in plan view. FIG. 10B is similar to the arrangement of FIG. 10A, but the spacing of collimator apertures 1004 over the same image sensor pixel 1002 (i.e., distance $d_1$) is shorter than the spacing between collimator apertures 1004 over neighboring image sensor pixels 1002 (i.e., distance $d_2$).

In some embodiments, randomization can be introduced into the collimator hole pattern, such that the collimator holes are not placed on a perfectly regular pattern. For instance, the collimator hole locations can be irregular or shifted from the regular pattern locations by random amounts to e.g., mitigate against moiré effects.

Various arrangements for providing a cluster of multiple collimator holes over a single image sensor pixel are within the scope of the disclosure. FIGS. 11A-11H provide several non-limiting examples, which provide variations on the hole It will be appreciated that various parameters in the configurations in FIGS. 11A-11H are provided by way of example, such as thickness, hole diameter, and the like, but other values may be used depending on the implementation. While exemplary hole areas and diameters for the collimator holes are provided, it will be appreciated that the area or diameter can vary over a height of the aperture (e.g., as shown in FIG. 6C). In these cases, the aspect ratio can be determined based on any appropriate statistical aggregate of the diameter over the height of the hole or a cross sectional diameter across a length of the hole.

The configurations in FIGS. 11A, 11B, 11C may include one collimator hole per pixel, as indicated by the projected viewing cones 1104 per pixel. Hexagonal packing arrangements of the collimator holes in each cluster are shown in FIGS. 11D and 11F, while square packing arrangements of the collimator holes in each cluster are shown in FIGS. 11E, 11G, 11H. The collimator holes may be arranged in square arrays in uniform spacing, e.g., not clustered over one pixel. A projected viewing cone 1104 corresponds to collimator hole 1102.

FIG. 11D shows a hexagonal packing arrangement of the collimator holes in each cluster. A hexagonal packing arrangement or hexagonal array may provide a higher fill factor compared to a square packing arrangement or square array. However, when implemented over a square array image sensor, a square arrangement of holes may provide a more efficient arrangement by avoiding positioning of holes over or close to pixel borders, where they can contribute to crosstalk due to light leakage onto neighboring pixels or a reduction in efficiency due to light incident on inactive border areas between image sensor pixels.

FIG. 11D shows clusters 1110 of three apertures per pixel arranged in a hexagonal packing arrangement. Projected viewing cones 1108A, 1108B, and 1108C correspond to collimator holes 1106A, 1106B, and 1108C, respectively. As shown, the clusters 1110 are arranged into a square array of clusters.

FIG. 11E shows clusters 1112 of four apertures per pixel arranged in a square packing arrangement. The apertures in FIG. 11E are also arranged with uniform spacing, similar to the embodiment shown in FIG. 10A.

FIG. 11F shows clusters 1114 of five apertures per pixel. In FIG. 11F, the apertures with the clusters 1114 are arranged in hexagonal packing arrangement, while the clusters 1114 themselves are arranged in a square packing arrangement (relative to the orientation of the figure sheet). In some implementations, the apertures in each cluster 1114 can be said to be in a square packing arrangement where the square packing of each pixel is rotated 45 degrees relative an underlying image sensor pixel arrangement (not shown). The rotated clusters may be also arranged such that an aperture is included proximate a center of the pixel with four apertures surrounding the center aperture, and apertures in the rotated square packing arrangement that would otherwise overlie a border between pixels are omitted to avoid crosstalk (i.e., apertures that would overlie the left, right, top, and bottom border of each square encompassing the cluster are omitted and instead occupied by light blocking regions). The rotated clusters are also themselves arranged in a square array relative to each other to match the arrangement of an underlying image sensor pixel array.

FIG. 11G shows clusters 1116 of four apertures per pixel arranged in a square packing arrangement. FIG. 11H shows clusters 1118 of four apertures per pixel arranged in a square packing arrangement. In FIGS. 11G-11H, apertures in the same cluster 1116 or 1118 are arranged with closer transverse spacing than apertures from neighboring clusters, similar to the embodiment shown in FIG. 10B. In FIG. 11G, the relative spacing of apertures in the same cluster 1116 is smaller than the relative spacing of apertures in the same cluster 1118 in FIG. 11H.

Figure 12B:
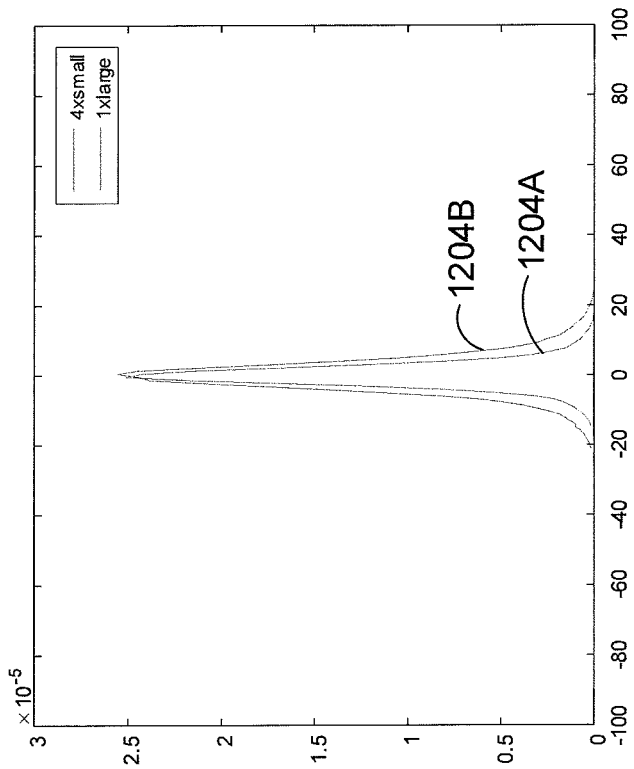
FIGS. 12A-12B are examples that compare the spatial response and acceptance angle of collimator configurations with one hole per pixel or multiple holes per pixel.
Figure 12A:
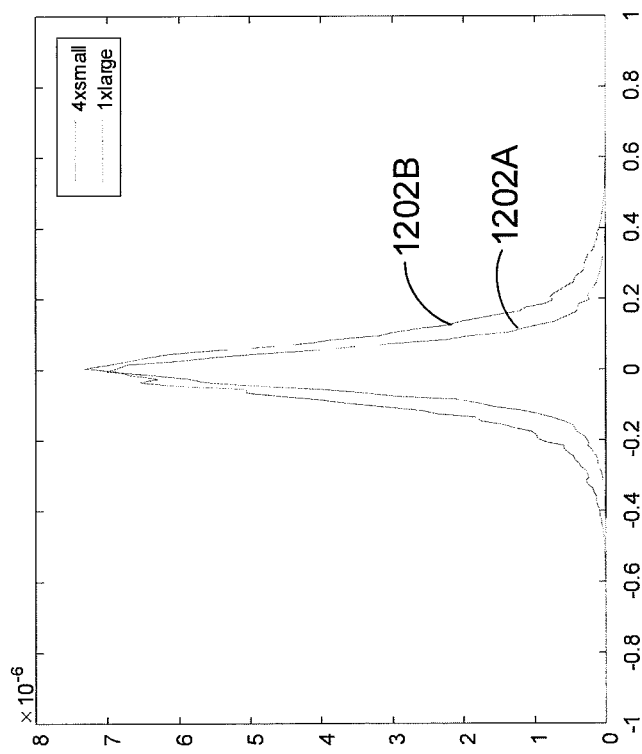

FIGS. 12A-12B are examples that compare the spatial response and acceptance angle of collimator configurations with one hole per pixel or multiple holes per pixel. FIG. 12A provides a cross section of spatial responses (i.e., projected viewing cone corresponding to a sampled area measured on the finger) for a configuration with four holes in a clustered collimator configuration (line 1202A) versus a configuration with one large hole collimator per pixel (line 1202B). As shown, the spatial response is smaller for the configuration with four holes, which reduces cross-talk or blurring.

FIG. 12B illustrates a respective acceptance angle between the two collimator configurations discussed. Line 1204A shows the acceptance angle for the four hole per pixel configuration, and line 1204B shows the acceptance angle for the one hole per pixel configuration. As shown, the clustered hole arrangement (i.e., four holes per pixel) can provide a sharper transition band, which may provide for an improved contrast ratio.

Figure 13A:
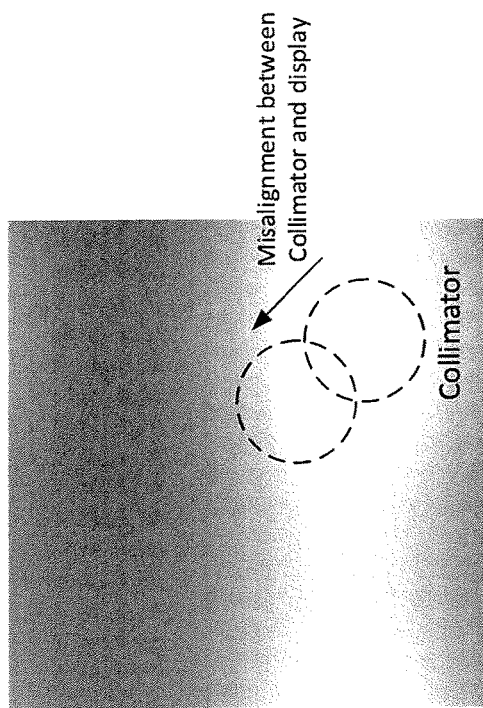
FIGS. 13A-13B illustrate simulated transmission maps through a display as a function of the collimator location for a configuration with a single collimator hole per pixel, according to some example embodiments.
Figure 13B:
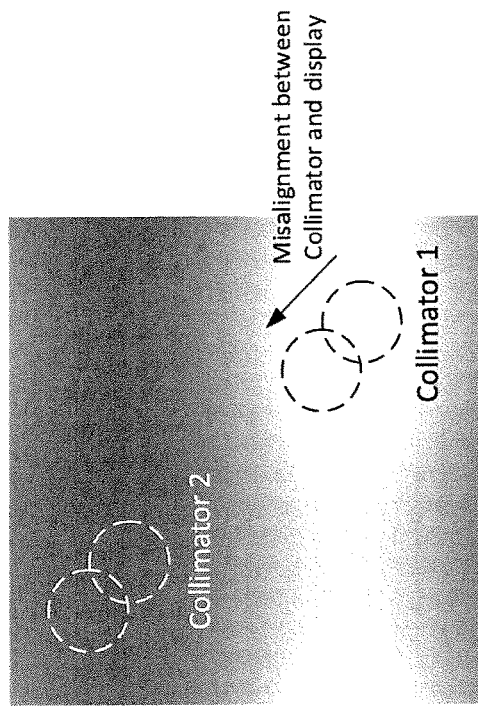
Figure 14A:
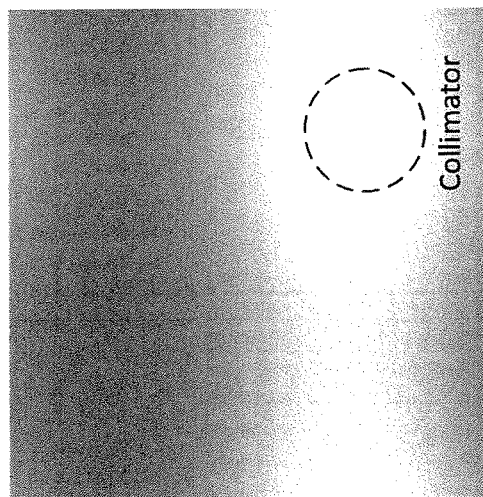
FIGS. 14A-14B illustrate simulated transmission maps through a display as a function of the collimator location for a configuration with multiple collimator holes per pixel, according to some example embodiments.
Figure 14B:
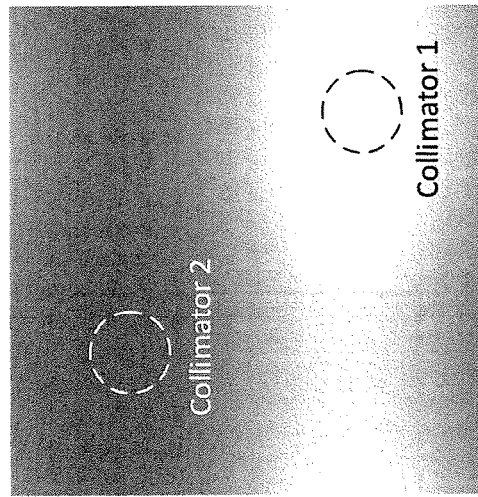

FIGS. 13A-13B and FIGS. 14A-14B illustrate simulated transmission maps through a display as a function of the collimator location, according to some example embodiments. FIGS. 13A-13B refer to a configuration with a single collimator hole per pixel, and FIGS. 14A-14B refer to a configuration with multiple collimator holes per pixel.

In embodiments where the collimator filter layer and image sensor array are disposed below a display layer (e.g., see FIG. 3B), the light intensity may dependent on the relative position of the collimator with respect to the display. This may be a result of display elements, such as wiring, emissive pixels, or other elements, that shadow or occlude the collimator filter layer and image sensor array. As can be seen in the examples in FIGS. 13A-13B and FIGS. 14A-14B, certain portions of the pixel are darker than others, illustrating that these portions are occluded by display elements.

FIG. 13A illustrates a collimator location within the image sensor pixel at an optimal position that is not shaded by display elements. FIG. 13B illustrates a collimator location within the image sensor pixel at a misaligned position that is partially shaded by display elements. As a result of this misalignment, the light intensity detected at the image sensor array can be changed, resulting in moiré effect on the captured image.

By using a cluster of collimator apertures or holes with smaller diameters (FIGS. 14A-14B), the intensity variation of the transmitted light may be reduced. One embodiment provides positioning smaller-diameter collimator apertures or holes at locations where the spatial gradient of the intensity variation is smaller. Another effect of having a clustered hole collimator configuration is an averaging effect, for example, by placing a collimator aperture or hole at a location with lower transmission and a collimator aperture or hole at a location with higher transmission.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An optical sensor, comprising:
an image sensor array comprising a plurality of pixels; and
a collimator filter disposed above the image sensor array, the collimator filter comprising a plurality of light collimating apertures and light blocking material, wherein multiple light collimating apertures of the plurality of light collimating apertures are disposed within a photosensitive area of one of the pixels in the plurality of pixels, and wherein the multiple light collimating apertures are disposed over different portions of the photosensitive area of the one of the pixels,
wherein the image sensor array comprises a plurality of photodiodes formed on a glass thin film transistor substrate, wherein the photosensitive area of one of the plurality of pixels corresponds to a single one of the photodiodes.

2. The optical sensor of claim 1, wherein the multiple light collimating apertures are arranged in a hexagonal packing arrangement.

3. The optical sensor of claim 1, wherein the multiple light collimating apertures are arranged in a square packing arrangement.

4. An optical sensor, comprising:
an image sensor array comprising a plurality of pixels; and
a collimator filter disposed above the image sensor array, the collimator filter comprising a plurality of light collimating apertures and a light blocking material, wherein multiple light collimating apertures of the plurality of light collimating apertures are disposed within a photosensitive area of one of the pixels of the plurality of pixels;
wherein the plurality of light collimating apertures includes an array of clusters of light collimating apertures, each cluster including multiple light collimating apertures disposed within a photosensitive area of a respective single one of the pixels of the plurality of pixels;
wherein the pixels of the plurality of pixels are arranged in a square array, wherein the array of clusters is arranged in a square array corresponding to the plurality of pixels, and wherein the multiple light collimating apertures in each of the clusters are arranged in a square packing arrangement,
wherein a row of light collimating apertures in the square packing arrangement is rotated 45 degrees relative to a row of pixels in the square array.

5. The optical sensor of claim 4, wherein the spacing between adjacent apertures in at least one of the clusters is irregular and is shifted by a random amount.

6. An optical sensor, comprising:
an image sensor array comprising a plurality of pixels, and
a collimator filter disposed above the image sensor array, the collimator filter comprising a plurality of light collimating apertures and a light blocking material, wherein multiple light collimating apertures of the plurality of light collimating apertures are disposed within a photosensitive area of one of the pixels of the plurality of pixels;
wherein the plurality of light collimating apertures includes an array of clusters of light collimating apertures, each cluster including multiple light collimating apertures disposed within a photosensitive area of a respective single one of the pixels of the plurality of pixels;
wherein the pixels of the plurality of pixels are arranged in a square array, wherein the array of clusters is arranged in a square array corresponding to the plurality of pixels, and wherein the multiple light collimating apertures in each of the clusters are arranged in a square packing arrangement,
wherein a spacing between adjacent apertures in one of the clusters is less than a spacing between adjacent apertures from a neighboring pair of the clusters.

* * * * *